(12) United States Patent
Lee et al.

(10) Patent No.: US 12,263,713 B2
(45) Date of Patent: Apr. 1, 2025

(54) AIR CONDITIONER FOR VEHICLE

(71) Applicants: HYUNDAI MOTOR COMPANY, Seoul (KR); KIA CORPORATION, Seoul (KR); HANON SYSTEMS, Daejeon (KR)

(72) Inventors: Seung Ho Lee, Daejeon (KR); Seo-Jun Yoon, Daejeon (KR); Sang Ki Lee, Daejeon (KR); Yong Sik Kim, Daejeon (KR); Myung Hun Kang, Gwangmyeong-si (KR); Eung Young Kim, Anyang-si (KR); Jung Mo Kwak, Gunpo-si (KR)

(73) Assignees: Hyundai Motor Company, Seoul (KR); Kia Corporation, Seoul (KR); Hanon Systems, Daejeon (KR)

( * ) Notice: Subject to any disclaimer, the term of this patent is extended or adjusted under 35 U.S.C. 154(b) by 586 days.

(21) Appl. No.: 17/609,327

(22) PCT Filed: Apr. 29, 2020

(86) PCT No.: PCT/KR2020/005699
§ 371 (c)(1),
(2) Date: Nov. 5, 2021

(87) PCT Pub. No.: WO2020/226346
PCT Pub. Date: Nov. 12, 2020

(65) Prior Publication Data
US 2022/0314731 A1    Oct. 6, 2022

(30) Foreign Application Priority Data

May 9, 2019   (KR) .......................... 10-2019-0054147
May 9, 2019   (KR) .......................... 10-2019-0054149

(51) Int. Cl.
*B60H 1/00*    (2006.01)

(52) U.S. Cl.
CPC ..... *B60H 1/00028* (2013.01); *B60H 1/00528* (2013.01); *B60H 1/00564* (2013.01); *B60H 2001/00092* (2013.01)

(58) Field of Classification Search
CPC ............ B60H 1/00028; B60H 1/00528; B60H 1/00564; B60H 1/00535; B60H 2001/00092; B60H 2001/00214
(Continued)

(56) References Cited

U.S. PATENT DOCUMENTS

| 4,355,753 A | 10/1982 | Watanabe |
| 2010/0269943 A1* | 10/2010 | Arai ......................... F16L 5/00 52/220.8 |

(Continued)

FOREIGN PATENT DOCUMENTS

| CN | 102080742 | 6/2011 |
| CN | 203020014 | 6/2013 |

(Continued)

OTHER PUBLICATIONS

Xu Yong, et al. A study on the structural Design of Passenger Car Air-Conditioning Air Intake Grille 1994-2023 China Academic Journal Electronic Publishing House, Aug. 2013.

*Primary Examiner* — Steven B McAllister
*Assistant Examiner* — Charles R Brawner
(74) *Attorney, Agent, or Firm* — Morgan, Lewis & Bockius LLP

(57) ABSTRACT

An air conditioner for a vehicle may include a first air conditioner provided on the engine compartment side with respect to a dash panel, and including an intake unit of suctioning internal or external air and blowing same to the vehicle interior side; and a second air conditioner provided on the vehicle interior side with respect to the dash panel, and including a duct for discharging conditioned air to the (Continued)

vehicle interior side. The dash panel has a through hole formed therein, and has an air guide which connects the first air conditioner and the second air conditioner to each other through the through hole.

21 Claims, 8 Drawing Sheets

(58) Field of Classification Search
USPC .................................................... 454/139
See application file for complete search history.

(56) References Cited

U.S. PATENT DOCUMENTS

| | | | | |
|---|---|---|---|---|
| 2018/0099539 | A1* | 4/2018 | Han | B60H 1/00535 |
| 2020/0346512 | A1* | 11/2020 | Buckman | B60H 1/00535 |
| 2021/0206231 | A1* | 7/2021 | Tsukuda | B60H 1/00849 |

FOREIGN PATENT DOCUMENTS

| | | |
|---|---|---|
| CN | 205588932 | 9/2016 |
| CN | 107074064 | 8/2017 |
| CN | 107848371 | 3/2018 |
| CN | 107914542 | 4/2018 |
| CN | 207360030 | 5/2018 |
| CN | 113811456 | 12/2021 |
| CN | 114083955 | 2/2022 |
| CN | 115230425 | 10/2022 |
| DE | 3020683 | 12/1980 |
| DE | 19800103 | 7/1998 |
| DE | 102013003027 | 3/2014 |
| DE | 102017217707 | 4/2018 |
| FR | 2599310 | 12/1987 |
| FR | 2847855 | 6/2004 |
| FR | 3070317 | 1/2019 |
| JP | 5-7506 U | 2/1993 |
| JP | H0717233 | 1/1995 |
| JP | H0781374 | 3/1995 |
| JP | 10-100641 A | 4/1998 |
| JP | 2003-220824 | 8/2003 |
| JP | 2004-189059 | 7/2004 |
| JP | 2005-014703 | 1/2005 |
| JP | 2005-014705 | 1/2005 |
| JP | 2005-067569 | 3/2005 |
| JP | 4051962 B2 | 12/2007 |
| JP | 2010-247554 A | 11/2010 |
| JP | 2015-533108 | 11/2015 |
| JP | 2019-26177 A | 2/2019 |
| KR | 10-2011-0103509 | 9/2011 |
| KR | 10-2014-0024810 | 3/2014 |
| KR | 10-2015-0041739 | 4/2015 |
| KR | 10-2017-0086719 | 7/2017 |
| KR | 10-2018-0038728 A | 4/2018 |
| KR | 10-2019-0081317 | 7/2019 |
| KR | 10-2020-0129559 | 11/2020 |

* cited by examiner

AIR CONDITIONER FOR VEHICLE

CROSS-REFERENCE TO RELATED APPLICATION

The present application is a U.S. National Phase entry of International Patent Application No. PCT/KR2020/005699, filed Apr. 29, 2020, which claims priority to Korean Patent Application No. 10-2019-0054147, filed May 9, 2019 and Korean Patent Application No. 10-2019-0054149, filed May 9, 2019, the entire contents of which are incorporated herein for all purposes by this reference.

BACKGROUND OF THE INVENTION

Field of the Invention

The present invention relates to an air conditioner for a vehicle. More particularly, the present invention relates to an air conditioner for a vehicle, in which a first air conditioner and a second air conditioner are respectively mounted at an engine compartment and at the interior of a vehicle room, with an air guide being mounted therebetween to guide movement of air, securing a space at the interior of the vehicle room and also smoothly blowing air at the first air conditioner to the second air conditioner without loss.

Description of Related Art

As illustrated in FIG. 1 and FIG. 2, a vehicle includes an air conditioner 1 for cooling or heating the interior of the vehicle room.

Such an air conditioner 1 includes an intake unit 3 configured to receive and blow indoor air and outdoor air to the interior of the vehicle room, and includes a heat exchanger unit 5 configured to cool or heat air which is blown to the interior of the vehicle room.

The intake unit 3 is provided with an indoor air inlet port and an outdoor air inlet port that are configured to introduce indoor air and outdoor air therethrough, respectively, and is provided with a blower 3a configured to blow introduced indoor air and outdoor air to the heat exchanger unit 5. Accordingly, the intake unit 3 inhales indoor air and the outdoor air inside and outside of the vehicle room and blows to the interior of the vehicle room.

The heat exchanger unit 5 is provided with an evaporator 5a and a heater 5b, and is configured to cool or heat indoor air and outdoor air that are blown from the intake unit 3. Accordingly, the interior of the vehicle room is cooled or heated.

Meanwhile, such an air conditioner is generally mounted at the interior of the vehicle room with respect to a dash panel D. At the instant time, the outdoor air inlet port communicates with the outside of the vehicle room, introducing outdoor air therethrough.

However, since such a conventional air conditioner has a structure which is provided at the interior of the vehicle room with respect to the dash panel D, securing of space at the interior of the vehicle room is very difficult.

For the convenience of passengers, the securing of space at the interior of the vehicle room has been increasingly in demand. However, there is a problem that the structure of the conventional air conditioner 1 which is mounted at the interior of the vehicle room is not able to cope with the securing of space at the interior of the vehicle room, and there is a limitation of securing of space at the interior of the vehicle room due to the present problem.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air conditioner for a vehicle in which the air conditioner is configured to minimize the size of a portion thereof disposed at the interior of a vehicle room by improving the arrangement structure, the mounted position, and the like of an intake unit and a heat exchanger unit.

Various aspects of the present invention are to provide an air conditioner for a vehicle in which the air conditioner advantageously secures the space at the interior of the vehicle room and thus increases space utilization at the interior of the vehicle room so that convenience of a passenger is improved by configuring the portion of the air conditioner mounted at the interior of the vehicle room to be minimized.

In various aspects of the present invention, there is provided an air conditioner for a vehicle in which the air conditioner performs cooling or heating by supplying cold air or hot air into an interior of a vehicle room, the air conditioner including: a first air conditioner mounted at an engine compartment with respect to a dash panel and including an intake unit configured to receive and blow indoor air and outdoor air to the interior of the vehicle room; a second air conditioner mounted at the interior of the vehicle room with respect to the dash panel and including a duct discharging conditioned air to the interior of the vehicle room; and an air guide connecting the first air conditioner and the second air conditioner to each other through a through-hole formed in the dash panel.

The first air conditioner and the second air conditioner may be provided with a first internal flow path and a second internal flow path, respectively, wherein, at the dash panel, the air guide may connect the first internal flow path of the first air conditioner with the second internal flow path of the second air conditioner so that air at the first internal flow path of the first air conditioner is guided to the second internal flow path of the second air conditioner.

Furthermore, the air guide may have a first side portion engaged with a circumferential portion around the first internal flow path of the first air conditioner and may have a second side portion engaged with a circumferential portion around the second internal flow path of the second air conditioner, and a center portion thereof may be provided with an air guide hole for communicating the first internal flow path of the first air conditioner with the second internal flow path of the second air conditioner.

Furthermore, the air conditioner may further include: a coupling groove formed along a circumference of the first side portion of the air guide; and a coupling protrusion formed on a portion of the first air conditioner corresponding to the circumference of the first side portion of the air guide, wherein the first side portion of the air guide may be engaged with the first air conditioner by coupling of the coupling groove and the coupling protrusion.

Furthermore, the second side portion of the air guide may have a structure in which the second side portion of the air guide is inserted into the second internal flow path of the second air conditioner by passing through the through-hole formed in the dash panel.

According to the air conditioner of the present invention, since the air conditioner has a structure in which the intake unit is disposed at the engine compartment and the heat exchanger unit is disposed at the interior of the vehicle room, a portion of the air conditioner disposed at the interior of the vehicle room may be minimized.

Furthermore, since the structure is configured for minimizing the portion of the air conditioner disposed at the interior of the vehicle room, space at the interior of the vehicle room is advantageously secured, so that convenience of a passenger may be remarkably improved by increasing space utilization of the interior of the vehicle room.

Furthermore, in the structure, the air guide is mounted between the intake unit and the heat exchanger unit, and blown air of the intake unit is guided to the heat exchanger unit through the air guide. Therefore, although the intake unit and the heat exchanger unit are respectively mounted at the engine compartment and the interior of the vehicle room and are respectively disposed at separate spaces, air at the intake unit may be blown to the heat exchanger unit without loss.

Furthermore, in the structure, the intake unit and the heat exchanger unit are respectively mounted at the engine compartment and the interior of the vehicle room with the dash panel interposed therebetween, and the first air flow path between the through-hole of the dash panel and the intake unit and the second air flow path between the through-hole of the dash panel and the heat exchanger unit are sealed by the sealing portion. Therefore, although the intake unit and the heat exchanger unit are respectively mounted at the engine compartment and the interior of the vehicle room and are respectively disposed at separate spaces, air at the intake unit may be blown to the heat exchanger unit without loss.

Furthermore, although the intake unit and the heat exchanger unit are respectively disposed at separate spaces, air at the intake unit may be blown to the heat exchanger unit without loss. Therefore, securing of space at the interior of the vehicle room and improving of cooling and heating performance may be realized at the same time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
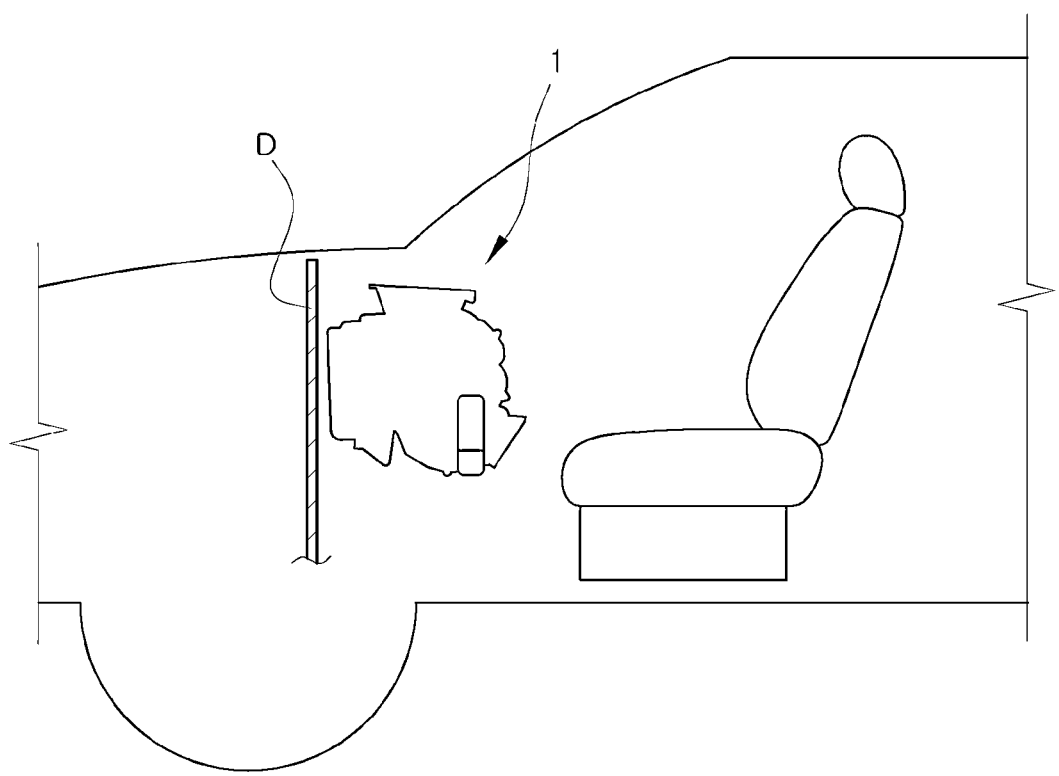
FIG. 1 is a side view schematically illustrating a conventional air conditioner for a vehicle.
Figure 2:
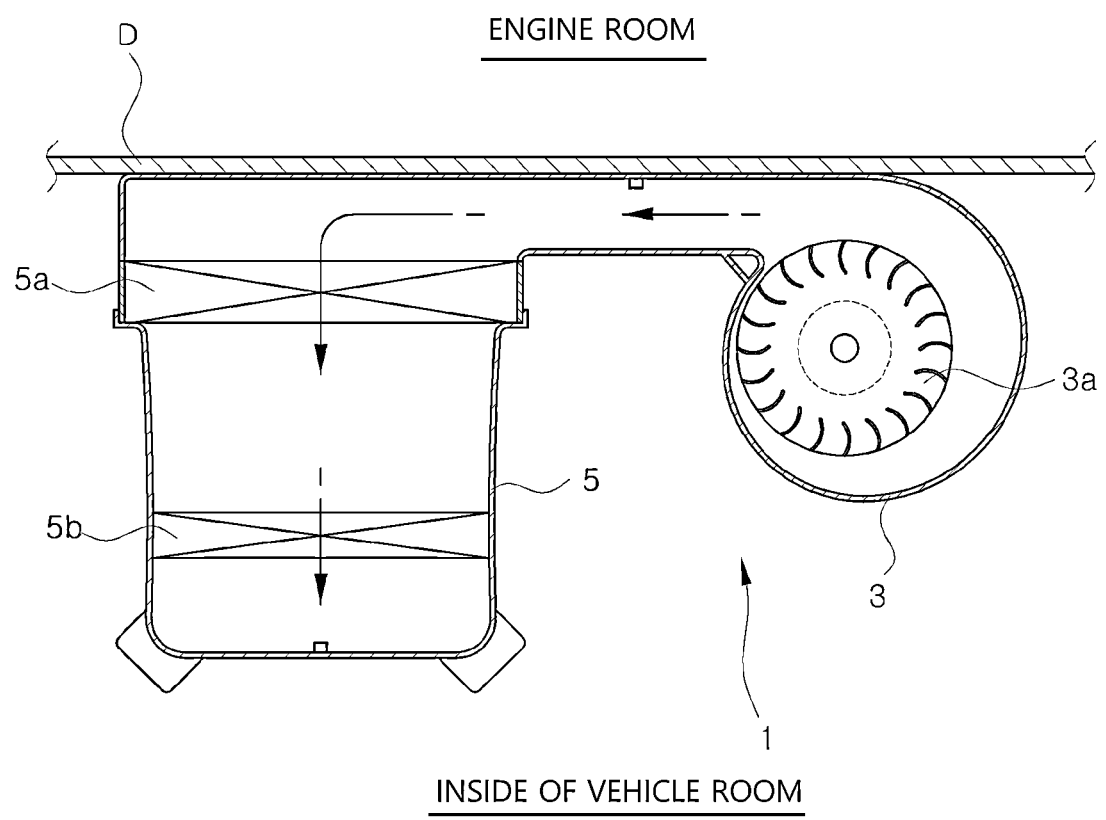
FIG. 2 is a plan cross-sectional view exemplarily illustrating the conventional air conditioner for a vehicle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of an air conditioner for a vehicle according to various exemplary embodiments of the present invention will now be described in detail with reference to the accompanying drawings.

Figure 3:
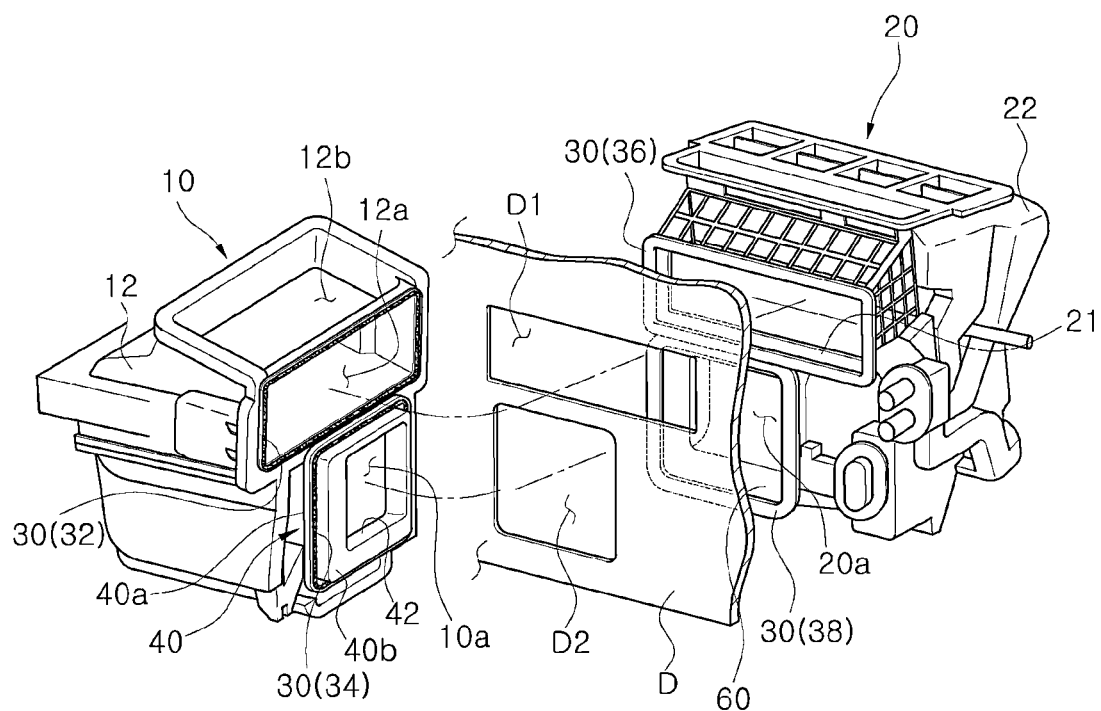
FIG. 3 is an exploded perspective view exemplarily illustrating a configuration of an air conditioner for a vehicle according to various exemplary embodiments of the present invention.
Figure 5:
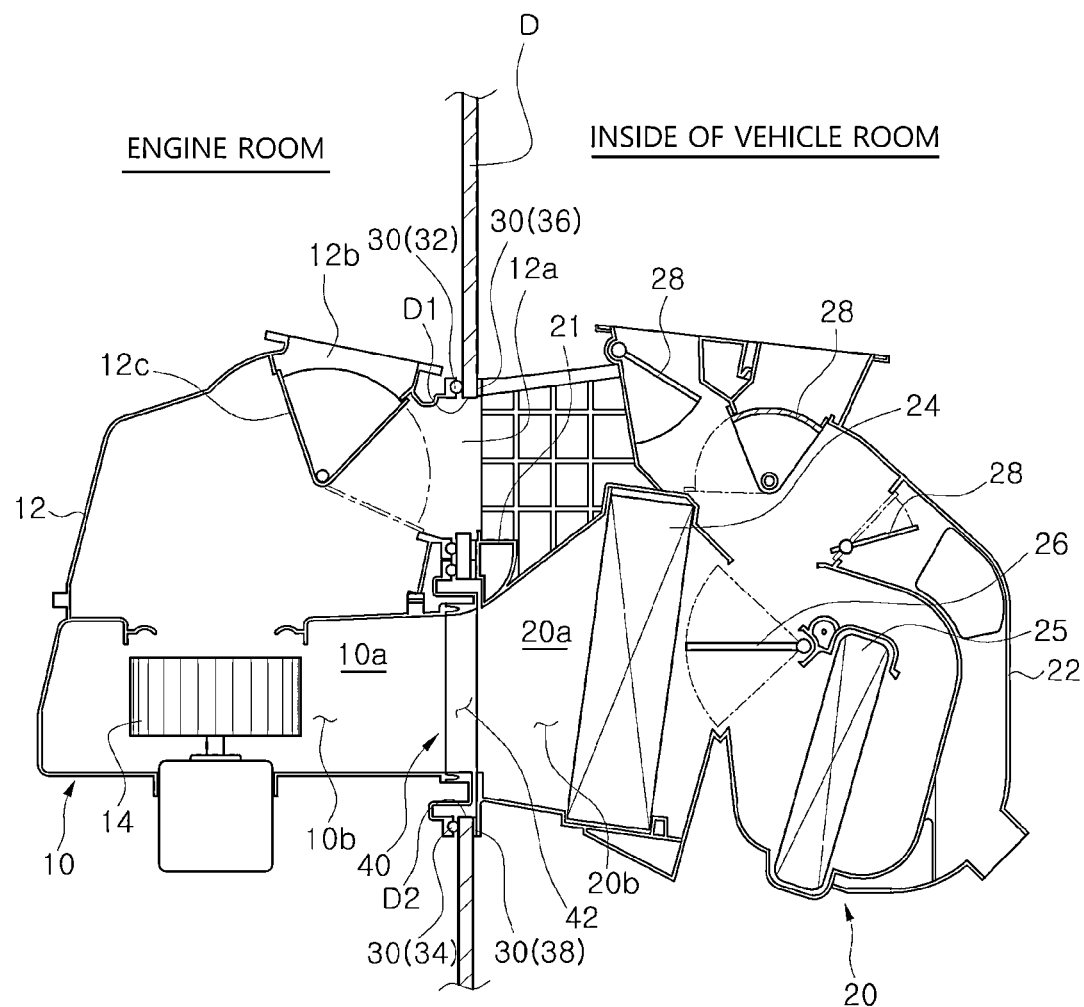
FIG. 5 is a side cross-sectional view exemplarily illustrating the configuration of the air conditioner for a vehicle according to various exemplary embodiments of the present invention.

Referring to FIGS. 3 and 5, the air conditioner for the vehicle includes a first air conditioner in which an intake unit 10 configured to receive and blow an indoor air and an outdoor air to interior of a vehicle room is provided, and includes a second air conditioner in which a heat exchanger unit 20 is configured to cool or heat air blown to the interior of the vehicle room.

The intake unit 10 of the first air conditioner is mounted at an engine compartment with respect to a dash panel D, and is provided with an intake case 12.

An indoor air inlet port 12a and an outdoor air inlet port 12b are formed on the intake case 12, and an intake door 12c is mounted between the indoor air inlet port 12a and the outdoor air inlet port 12b.

The indoor air inlet port 12a communicates with the interior of the vehicle room, and introduces air at the interior of the vehicle room to inside of the intake case 12. The outdoor air inlet port 12b communicates with the outside of the vehicle, and introduces air outside of the vehicle room to the inside of the intake case 12.

The indoor air inlet port 12a is provided to penetrate through a first through-hole D1 which is formed on the dash panel D and connects with the interior of the vehicle room, introducing the air at the interior of the vehicle room.

Here, on a portion of the heat exchanger unit 20 at the interior of the vehicle room corresponding to the indoor air inlet port 12a of the intake unit 10, an indoor air inlet duct 21 aligned with the indoor air inlet port 12a is formed.

The indoor air inlet duct 21 is aligned with the indoor air inlet port 12a of the intake unit 10 with the first through-hole D1 interposed therebetween.

Such an indoor air inlet duct 21 allows the interior of the vehicle room to communicate with the indoor air inlet port 12a of the intake unit 10. Therefore, air at the interior of the vehicle room is allowed to be introduced to the indoor air inlet port 12a of the intake unit 10.

The intake door 12c is a dome-type door that rotationally moves between the outdoor air inlet port 12b and the indoor air inlet port 12a, and selectively opens the outdoor air inlet port 12b or the indoor air inlet port 12a. Therefore, the outdoor air or the indoor air may be selectively introduced.

Furthermore, a blower 14 is mounted in the intake case 12.

The blower 14 is configured to receive the indoor air or the outdoor air through the outdoor air inlet port 12b and the indoor air inlet port 12a that are positioned above thereof, configured to discharge inhaled indoor or outdoor air to a first internal flow path 10a, and configured to blow discharge indoor or outdoor air to the heat exchanger unit 20 through the first internal flow path 10a.

Figure 4:
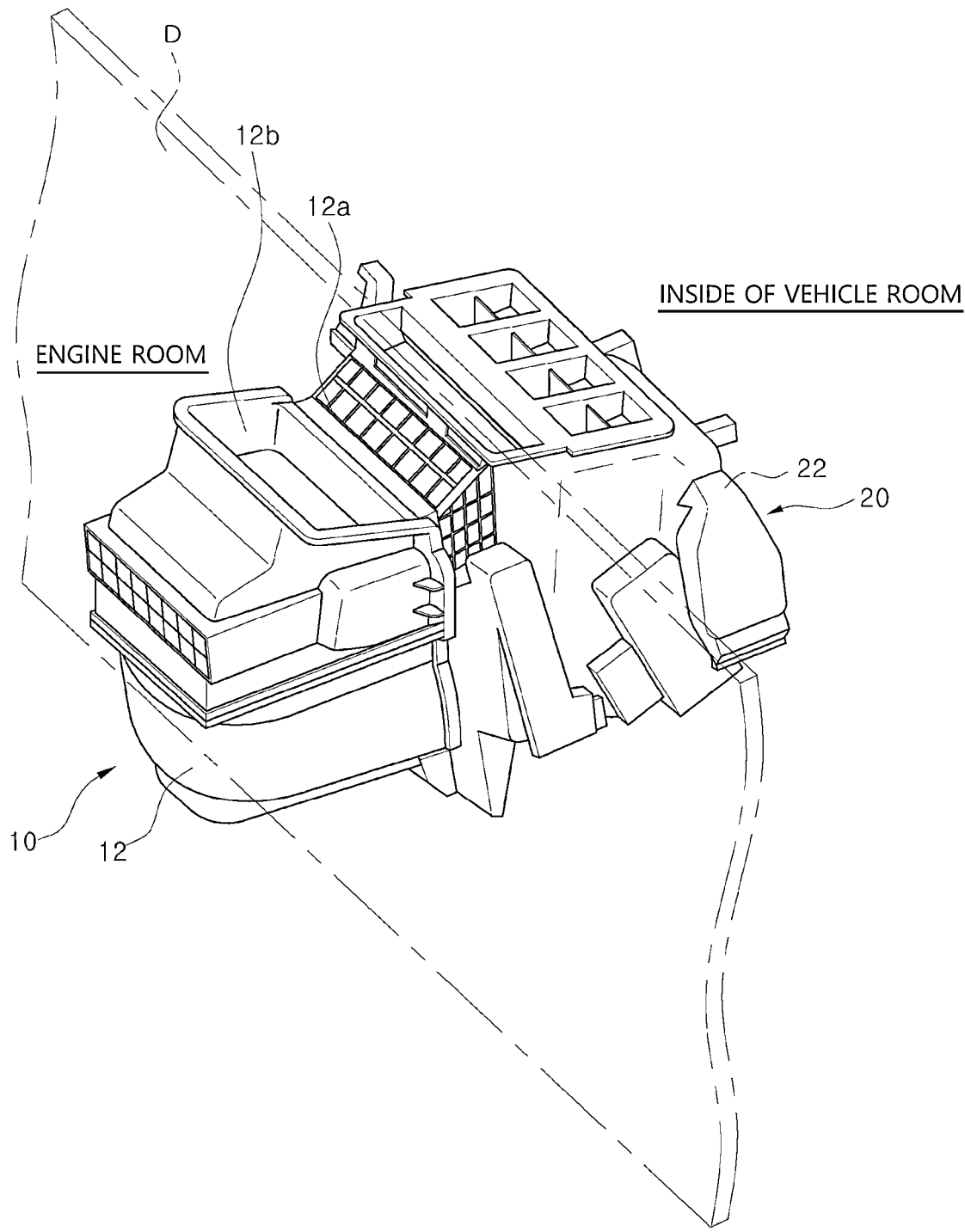
FIG. 4 is a perspective view of an assembled state of FIG. 3 illustrating the configuration of the air conditioner for a vehicle according to various exemplary embodiments of the present invention.

Referring to FIG. 3, FIG. 4, and FIG. 5 again, the heat exchanger unit 20 of the second air conditioner is mounted at the interior of the vehicle room with respect to the dash panel D, and is provided with a heat exchanger case 22.

The heat exchanger case 22 is mounted to correspond to the intake case 12 of the intake unit 10 with the dash panel D interposed therebetween, and is provided with a second internal flow path 20a that communicates with the first internal flow path 10a of the intake case 12.

The second internal flow path 20a communicates with the first internal flow path 10a of the intake unit 10 through a second through-hole D2 of the dash panel D. Furthermore, an evaporator 24, a heater 25, a temp door 26, and a plurality of mode doors 28 are mounted in the second internal flow path 20a that communicates with the first internal flow path 10a.

Meanwhile, the second internal flow path 20a is rectilinearly connected to the first internal flow path 10a of the intake unit 10.

An air discharge flow path portion 10b at a downstream side of the blower 14 in the first flow path 10a of the intake unit 10 is rectilinearly connected to an internal flow path portion 20b at an upstream side of the evaporator 24 in the second internal flow path 20a of the heat exchanger unit 20.

The first internal flow path 10a of the intake unit 10 and the second internal flow path 20a of the heat exchanger unit 20 that are rectilinearly connected to each other allow a discharge air of the blower 14 to be introduced to the heat exchanger unit 20 while a rectilinear flow of the discharge air is maintained.

Therefore, an air flow from the intake unit 10 to the heat exchanger unit 20 is allowed to be maintained smoothly. Accordingly, the discharge air of the blower 14 may be introduced to the interior of the vehicle room without loss.

Meanwhile, in the drawings and the description of the present invention, it is illustrated in that a heat exchanger of the heat exchanger unit 20, which is the evaporator 24 and the heater 25, is mounted in the second air conditioner. However, the evaporator 24 and the heater 25 may be mounted in the first air conditioner. The evaporator 24 and the heater 25 may be mounted in the intake case 12 of the first air conditioner.

Furthermore, referring to FIG. 3 and FIG. 5, FIG. 6 and FIG. 7, the air conditioner of the present invention includes a sealing portion 30 that seals a space between the through-holes D1 and D2 of the dash panel D and a first air flow path of the intake unit 10 and a space between the through-holes D1 and D2 of the dash panel D and a second air flow path of the heat exchanger unit 20.

As illustrated in FIG. 3 and FIG. 5, FIG. 6 and FIG. 7, the sealing portion 30 includes: a first sealer 32 that seals a space between the first through-hole D1 of the dash panel D and the indoor air inlet port 12a of the intake unit 10; and a second sealer 34 that seals a space between the second through-hole D2 of the dash panel D and the second internal flow path 20a of the intake unit 10.

The first sealer 32 is formed of any one material of rubber, silicone, and urethane foam, and is mounted in an annular shape along a circumferential portion around the indoor air inlet port 12a of the intake unit 10.

The first sealer 32 airtightly seals a space between the circumferential portion around the indoor air inlet port 12a of the intake unit 10 and a corresponding circumferential portion around the first through-hole D1 of the dash panel D while in a state of being disposed therebetween.

Therefore, air leakage occurring at the space between the first-through hole D1 of the dash panel D and the indoor air inlet port 12a of the intake unit 10 is prevented.

The second sealer 34 is formed of any one material of rubber, silicone, and urethane foam, and is mounted in an annular shape along a circumferential portion around the first internal flow path 10a of the intake unit 10.

The second sealer 34 airtightly seals a space between the circumferential portion around the first internal flow path 10a of the intake unit 10 and a corresponding circumferential portion around the second through-hole D2 of the dash panel D while in a state of being disposed therebetween.

Therefore, air leakage occurring at the space between the second through-hole D2 of the dash panel D and the first internal flow path 10a of the intake unit 10 is prevented.

Here, at the circumferential portion around the indoor air inlet port 12a of the intake unit 10, a first seating groove 12a-1 on which the first sealer 32 is fixedly accommodated is formed. Furthermore, at the circumferential portion around the first internal flow path 10a of the intake unit 10, a second seating groove 10a-1 on which the second sealer 34 is fixedly accommodated is formed.

Figure 6:
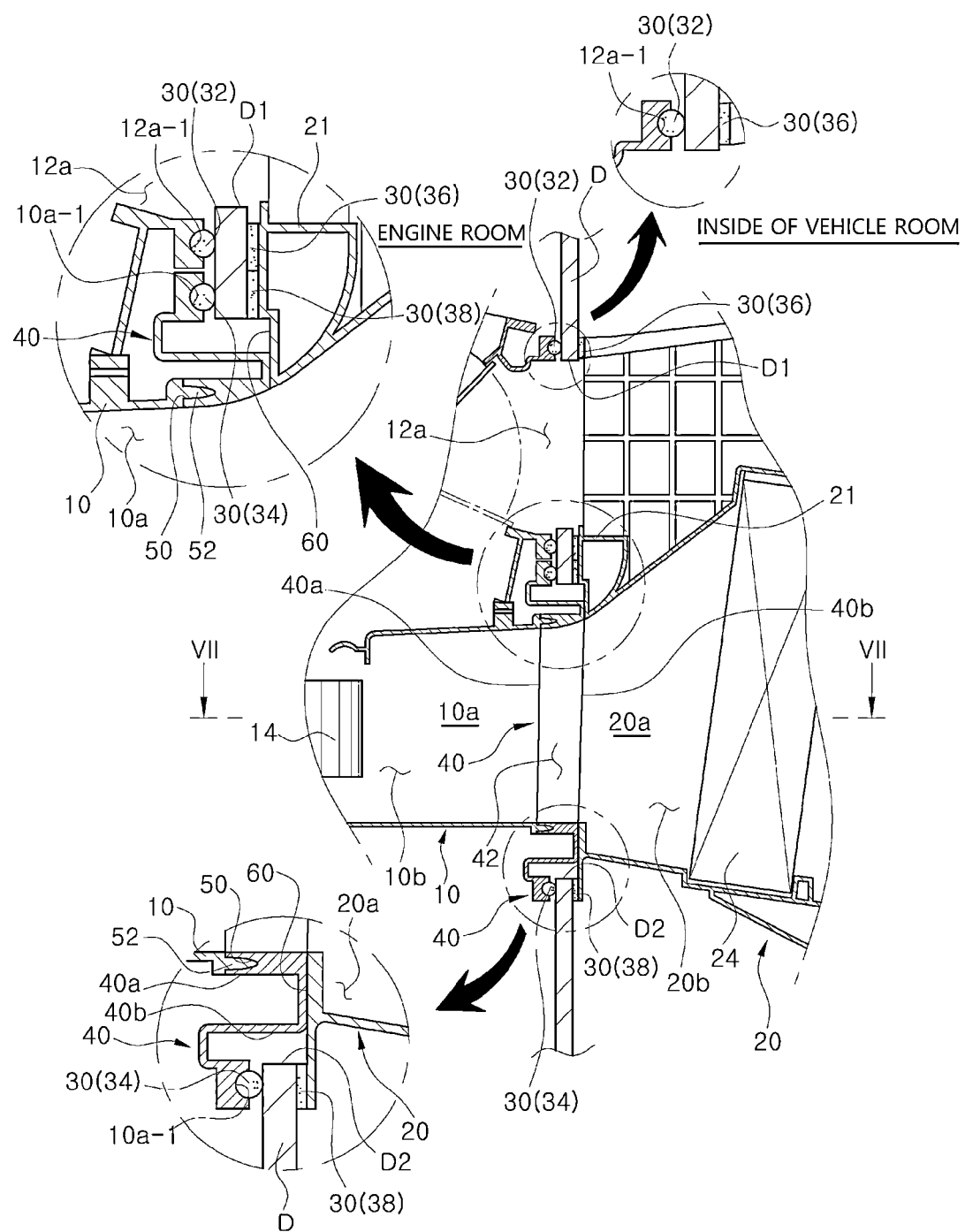
FIG. 6 is a side cross-sectional view exemplarily illustrating a sealing portion and an air guide that configure the air conditioner for a vehicle according to various exemplary embodiments of the present invention in detail.

Referring to FIG. 3 and FIG. 5, FIG. 6 and FIG. 7 again, the sealing portion 30 includes: a third sealer 36 that seals a space between the first through-hole D1 of the dash panel D and the indoor air inlet duct 21 of the heat exchanger unit 20; and a fourth sealer 38 that seals a space between the second through-hole D2 of the dash panel D and the second internal flow path 20a of the heat exchanger unit 20.

The third sealer 36 is formed of any one material of rubber, silicone, and urethane foam, and is mounted in an annular shape along a circumferential portion around the indoor air inlet duct 21 of the heat exchanger unit 20.

The third sealer 36 airtightly seals a space between the circumferential portion around the indoor air inlet duct 21 of the heat exchanger unit 20 and a corresponding circumferential portion around the first through-hole D1 of the dash panel D while in a state of being disposed therebetween.

Therefore, air leakage occurring at the space between the first-through hole D1 of the dash panel D and the indoor air inlet duct 21 of the heat exchanger unit 20 is prevented.

The fourth sealer 38 is formed of any one material of rubber, silicone, and urethane foam, and is mounted in an annular shape along a circumferential portion around the second internal flow path 20a of the heat exchanger unit 20.

The fourth sealer 38 airtightly seals a space between the circumferential portion around the second internal flow path 20a of the heat exchanger unit 20 and a corresponding circumferential portion around the second through-hole D2 of the dash panel D while in a state of being disposed therebetween.

Therefore, air leakage occurring at the space between the second through-hole D2 of the dash panel D and the second internal flow path 20a of the heat exchanger unit 20 is prevented.

Meanwhile, with respect to the dash panel D, the sealing portion 30 at the interior of the vehicle room, which is the third and fourth sealers 36 and 38, and the sealing portion 30 at the engine compartment, which is the first and second sealers 32 and 34, are preferably formed of different materials and different constructions.

For example, the third and fourth sealers 36 and 38, which compose the sealing portion 30 at the interior of the vehicle room, are preferably formed of sponge material, and the first and second sealers 32 and 34, which compose the sealing portion 30 at the engine compartment, are preferably formed of rubber material.

The reason for the present configuration is as follows. That is, the first and second sealers 32 and 34, which compose the sealing portion 30 at the engine compartment, are exposed to rainwater, various foreign substances, or driving wind, so that the first and second sealers 32 and 34 are preferably formed of rubber material having excellent durability and excellent airtight property. Furthermore, since the third and fourth sealers 36 and 38, which compose the sealing portion 30 at the interior of the vehicle room, have less risk of being exposed to various contaminants or driving wind than the sealing portion 30 at the engine compartment, the third and fourth sealers 36 and 38 may be formed of sponge material.

Furthermore, referring to FIG. 3 and FIGS. 5 to 8, the air conditioner of the present invention further includes an air guide 40 mounted at a space between the first internal flow path 10a of the intake unit 10 and the second internal flow path 20a of the heat exchanger unit 20 such that the first internal flow path 10a of the intake unit 10 and the second internal flow path 20a of the heat exchanger unit 20 are connected to each other.

The air guide 40 guides air at the first internal flow path 10a of the intake unit 10 to the second internal flow path 20a of the heat exchanger unit 20, and an air guide hole portion 42 is provided at a center portion thereof.

Such an air guide 40 is formed corresponding to the shape of the first and second internal flow paths 10a and 20a of the intake unit 10 and the heat exchanger unit 20. Furthermore, a first side portion 40a is engaged with the circumferential portion of the first internal flow path 10a of the intake unit 10, and a second side portion 40b is engaged with the circumferential portion of the second internal flow path 20a of the heat exchanger unit 20.

Figure 7:
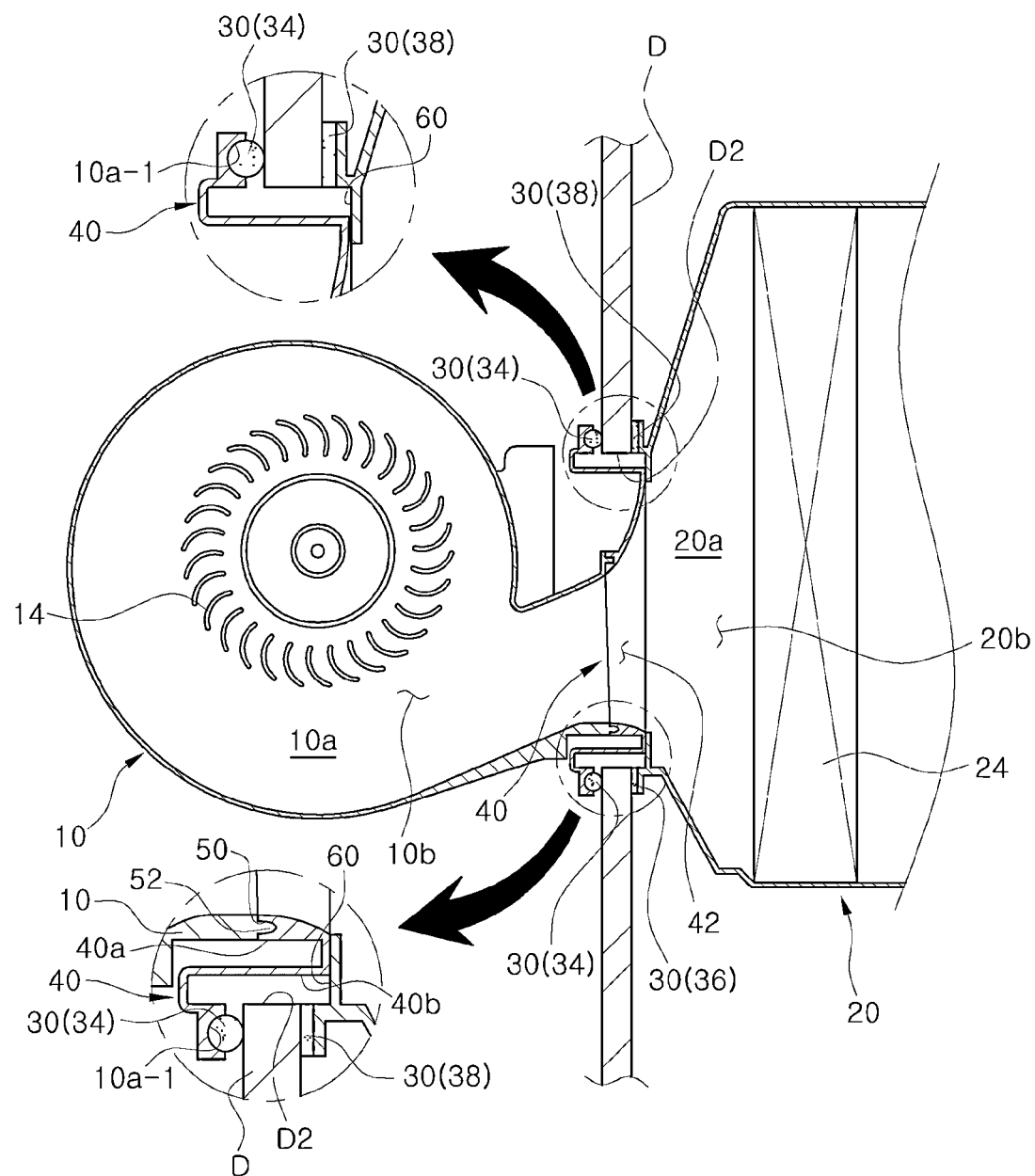
FIG. 7 is a cross-sectional view taken along line VII-VII in FIG. 6 illustrating the sealing portion and the air guide that configure the air conditioner for a vehicle according to various exemplary embodiments of the present invention in detail.

As illustrated in FIG. 6 and FIG. 7, the first side portion 40a of the air guide 40 is engaged with the intake unit 10 by a coupling of a coupling groove 50 and a coupling protrusion 52. At the instant time, the coupling groove 50 is formed along a circumference of the first side portion 40a of the air guide 40, and the coupling protrusion 52 is formed on a portion of the intake unit 10 corresponding to the coupling groove 50.

A part of the second side portion 40b of the air guide 40 passes through the second through-hole D2 of the dash panel D and is inserted into the second internal flow path 20a of the heat exchanger unit 20.

The part of the second side portion 40b of the air guide 40 passes through the second through-hole D2 of the dash panel D and is inserted into the second internal flow path 20a of the heat exchanger unit 20. At the instant time, a circumferential portion at an inlet side of the second internal flow path 20a of the heat exchanger unit 20 is formed with a third seating groove 60 on which the second side portion 40b of the air guide 40 is accommodated.

As the second side portion 40b of the air guide 40 is accommodated on the third seating groove 60 of the heat exchanger unit 20, the second side portion 40b of the air guide 40 is engaged with the circumferential portion of the second internal flow path 20a of the heat exchanger unit 20.

Here, the second side portion 40b of the air guide 40 and the third seating groove 60 of the heat exchanger unit 20 that are engaged with each other is formed to be in surface-contact with each other.

Accordingly, the second side portion 40b of the air guide 40 and the third seating groove 60 of the heat exchanger unit 20 that are in surface-contact with each other improve airtight property therebetween, so that occurrence of air leakage therebetween is prevented.

Air that passes through the air guide hole portion 42 in the center portion of the air guide 40 is prevented from leaking between the second side portion 40b of the air guide 40 and the third seating groove 60 of the heat exchanger unit 20.

Meanwhile, as the first side portion 40a and the second side portion 40b of the air guide 40 is respectively engaged with the intake unit 10 and the heat exchanger unit 20, the air guide hole portion 42 of the air guide 40 is respectively aligned with the first and second internal flow paths 10a and 20a of the intake unit 10 and the heat exchanger unit 20.

The air guide hole portion 42 connects the first internal flow path 10a of the intake unit 10 with the second internal flow path 20a of the heat exchanger unit 20, and the air guide hole portion 42 guides air at the first internal flow path 10a of the intake unit 10 to the second internal flow path 20a of the heat exchanger unit 20.

Here, the second internal flow path 20a of the heat exchanger unit 20 has a larger cross-sectional area than a cross-sectional area of the first internal flow path 10a of the intake unit 10.

At the present time, to smoothly connect the first internal flow path 10a of the intake unit 10 having a smaller cross-sectional area with the second internal flow path 20a of the heat exchanger unit 20 having a larger cross-sectional area without a step difference, the air guide hole portion 42 of the air guide 40 has a cross-sectional area that gradually increases from the first internal flow path 10a of the intake unit 10 to the second internal flow path 20a of the heat exchanger unit 20.

Meanwhile, the air guide 40 is configured as a separate member with respect to the intake unit 10 and the heat exchanger unit 20. Therefore, if necessary, it is possible to separate and replace the air guide 40 from the intake unit 10 and the heat exchanger unit 20.

The air guide 40 may be formed integrally with any one of the intake unit 10 and the heat exchanger unit 20 as needed. The air guide 40 may be formed integrally at a portion of the intake unit 10.

Referring to FIG. 3 and FIG. 5, FIG. 6, FIG. 7 and FIG. 8 again, the second sealer 34 that seals the space between the second internal flow path 20a of the intake unit 10 and the second through-hole D2 of the dash panel D is preferable to be mounted at the second side portion 40b of the air guide 40.

Figure 8:
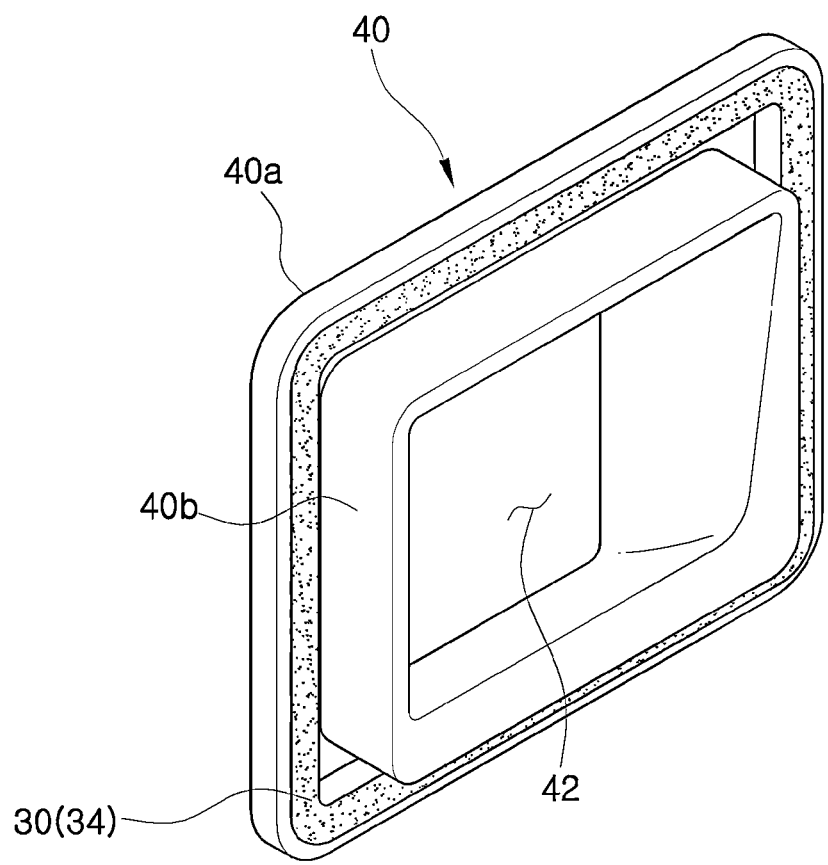
FIG. 8 is a perspective view exemplarily illustrating the air guide that configures the air conditioner for a vehicle according to various exemplary embodiments of the present invention in detail.

As illustrated in FIG. 3 and FIG. 8, the second sealer 34 is mounted along the circumferential portion around the air guide hole portion 42 of the air guide 40, and airtightly seals a space between the circumferential portion around the air guide hole portion 42 of the air guide 40 and the corresponding circumferential portion around the second through-hole D2 of the dash panel D by being in close in contact with the circumferential portion around the second through-hole D2 of the dash panel D.

According to the air conditioner of the present invention having a configuration described above, since the air conditioner has a structure in which the intake unit 10 is disposed at the engine compartment and the heat exchanger unit 20 is disposed at the interior of the vehicle room, a portion of the air conditioner disposed at the interior of the vehicle room may be minimized.

Furthermore, since the structure is configured for minimizing the portion of the air conditioner disposed at the interior of the vehicle room, space at the interior of the vehicle room is advantageously secured, so that convenience of a passenger may be remarkably improved by increasing space utilization of the interior of the vehicle room.

Furthermore, in the structure, the intake unit 10 and the heat exchanger unit 20 are mounted at the engine compartment and the interior of the vehicle room, respectively, with the dash panel D interposed therebetween, and the first air flow path between the through-holes D1 and D2 of the dash panel D and the intake unit 10 and the second air flow path between the through-holes D1 and D2 of the dash panel D and the heat exchanger unit 20 are sealed by the sealing portion 30.

Therefore, although the intake unit 10 and the heat exchanger unit 20 are respectively mounted at the engine compartment and the interior of the vehicle room and are respectively disposed at separate spaces, air at the intake unit 10 may be blown to the heat exchanger unit 20 without loss.

Furthermore, in the structure, the air guide 40 is mounted between the intake unit 10 and the heat exchanger unit 20, and blown air of the intake unit 10 is guided to the heat exchanger unit 20 through the air guide 40.

Therefore, although the intake unit 10 and the heat exchanger unit 20 are respectively mounted at the engine compartment and the interior of the vehicle room and are respectively disposed at separate spaces, air at the intake unit 10 may be blown to the heat exchanger unit 20 without loss.

Furthermore, although the intake unit 10 and the heat exchanger unit 20 are respectively disposed at separate spaces, air at the intake unit 10 may be blown to the heat exchanger unit 20 without loss. Therefore, securing of space at the interior of the vehicle room and improving of cooling and heating performance may be realized at the same time.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air conditioner apparatus for a vehicle in which the air conditioner apparatus performs cooling or heating by supplying cold air or hot air into an interior of a vehicle room, the air conditioner apparatus comprising:
   a first air conditioner portion mounted at an engine compartment with respect to a wall and including an intake unit configured to receive and blow indoor air and outdoor air to the interior of the vehicle room;
   a second air conditioner portion mounted at the interior of the vehicle room with respect to the wall and including a duct discharging conditioned air to the interior of the vehicle room; and
   an air guide connecting the first air conditioner portion and the second air conditioner portion to each other through a through-hole formed in the wall,
   wherein the first air conditioner portion and the second air conditioner portion are provided with a first internal flow path and a second internal flow path, respectively,
   wherein the air guide has a first side portion engaged with a circumferential portion around the first internal flow path of the first air conditioner portion and has a second side portion engaged with a circumferential portion around the second internal flow path of the second air conditioner portion, and a center portion thereof is provided with an air guide hole for communicating the first internal flow path of the first air conditioner portion with the second internal flow path of the second air conditioner portion, and
   wherein a second side portion of the air guide is inserted into the second internal flow path of the second air conditioner portion by passing through the through-hole formed in the wall.

2. The air conditioner apparatus of claim 1,
   wherein, at the wall, the air guide connects the first internal flow path of the first air conditioner portion with the second internal flow path of the second air conditioner portion so that air at the first internal flow path of the first air conditioner portion is guided to the second internal flow path of the second air conditioner portion.

3. The air conditioner apparatus of claim 1, further including:
   a coupling groove formed along a circumference of the first side portion of the air guide; and a coupling protrusion formed on a portion of the first air conditioner portion corresponding to the circumference of the first side portion of the air guide, wherein the first side portion of the air guide is engaged with the first air conditioner portion by coupling of the coupling groove and the coupling protrusion.

4. The air conditioner apparatus of claim 1,
wherein a flange surface on which the second side portion of the air guide is accommodated is formed on a circumferential portion at an inlet side of the second internal flow path of the second air conditioner portion, and wherein the second side portion of the air guide is engaged with the second air conditioner portion as the second side portion of the air guide is accommodated on the flange surface of the second air conditioner portion.

5. The air conditioner apparatus of claim 4, wherein the second side portion of the air guide and the flange surface of the second air conditioner portion are in surface-contact with each other.

6. The air conditioner apparatus of claim 5, wherein, as the first side portion and the second side portion of the air guide are engaged with the first air conditioner portion and the second air conditioner portion, respectively, an air guide hole portion of the air guide is aligned with the first and second internal flow paths of the first and second air conditioner portions, guiding air at the first internal flow path of the first air conditioner portion to the second internal flow path of the second air conditioner portion.

7. The air conditioner apparatus of claim 6, wherein the air guide hole portion of the air guide has a cross-sectional area that increases toward the second internal flow path of the second air conditioner portion.

8. The air conditioner apparatus of claim 7, wherein the air guide is configured as a separate member with respect to the first air conditioner portion and the second air conditioner portion, being configured for being separated from the first air conditioner portion and the second air conditioner portion and replaced.

9. The air conditioner apparatus of claim 1,
wherein a first air flow path of the first air conditioner portion and a second air flow path of the second air conditioner portion communicate with each other through the through-hole of the wall, and wherein the air conditioner apparatus further includes a sealing portion that airtightly seals a space between the wall and the first air conditioner portion and airtightly seals a space between the wall and the second air conditioner portion.

10. The air conditioner apparatus of claim 9,
wherein the first air conditioner portion is provided with an indoor air inlet port configured to introduce air from the interior of the vehicle room, and the indoor air inlet port communicates with the interior of the vehicle room through a first through-hole formed on the wall, and is provided with the first internal flow path configured to blow introduced air to the second internal flow path of the second air conditioner portion, and the first internal flow path communicates with the second internal flow path through a second through-hole formed on the wall, and wherein the sealing portion further includes:
a first sealer that seals a space between the indoor air inlet port of the intake unit and the first through-hole of the wall; and a second sealer that seals a space between the first internal flow path of the first air conditioner portion and the second through-hole of the wall.

11. The air conditioner apparatus of claim 10,
wherein the second air conditioner portion is provided with an indoor inlet duct mounted at the interior of the vehicle room to be aligned with an indoor air inlet duct of the first air conditioner portion with the first through-hole interposed therebetween, and wherein the sealing portion further includes:
a third sealer that seals a space between the indoor air inlet duct of the second air conditioner portion and the first through-hole of the wall; and a fourth sealer that seals a space between the second internal flow path of the second air conditioner portion and the second through-hole of the wall.

12. The air conditioner apparatus of claim 11, wherein the first sealer is mounted along a circumferential portion around the indoor air inlet port of the first air conditioner portion, and airtightly seals a space between the circumferential portion around the indoor air inlet port of the first air conditioner portion and a corresponding circumferential portion around the first through-hole of the wall.

13. The air conditioner apparatus of claim 12, wherein the second sealer is mounted along a circumferential portion around the first internal flow path of the first air conditioner portion, and airtightly seals a space between the circumferential portion around the first internal flow path of the first air conditioner portion and a corresponding circumferential portion around the second through-hole of the wall.

14. The air conditioner apparatus of claim 13, wherein the third sealer is mounted along a circumferential portion around the indoor air inlet duct of the second air conditioner portion, and airtightly seals a space between the circumferential portion around the indoor air inlet duct of the second air conditioner portion and a corresponding circumferential portion around the first through-hole of the wall.

15. The air conditioner apparatus of claim 14, wherein the fourth sealer is mounted along a circumferential portion around the second internal flow path of the second air conditioner portion, and airtightly seals a space between the circumferential portion around the second internal flow path of the second air conditioner portion and a corresponding circumferential portion around the second through-hole of the wall.

16. The air conditioner apparatus of claim 12, wherein a first seating groove on which the first sealer is securely accommodated is formed on the circumferential portion around the indoor air inlet port of the first air conditioner portion.

17. The air conditioner apparatus of claim 13, wherein a second seating groove on which the second sealer is securely accommodated is formed on the circumferential portion around the first internal flow path of the first air conditioner portion.

18. The air conditioner apparatus of claim 17, wherein, at the second through-hole of the wall, the air guide connects the first internal flow path of the first air conditioner portion with the second internal flow path of the second air conditioner portion, and the second sealer is mounted at a space between the air guide of the first air conditioner portion and a corresponding circumferential portion around the second through-hole of the wall and airtightly seals a space between the air guide of the first air conditioner portion and the second through-hole.

19. The air conditioner apparatus of claim 9, wherein the sealing portion at the interior of the vehicle room and the sealing portion at the engine compartment are formed of different materials and in different structures.

20. The air conditioner apparatus of claim 1, further including a heat exchanger configured to cool or heat air blown from the intake unit of the first air conditioner portion,
 wherein the heat exchanger is mounted inside the second air conditioner portion at the interior of the vehicle room.

21. The air conditioner apparatus of claim 1, further including a heat exchanger configured to cool or heat air blown from the intake unit of the first air conditioner portion,
 wherein the heat exchanger is mounted inside the second air conditioner portion.

* * * * *